Nov. 22, 1938.  A. M. ROSSMAN  2,137,989
ADJUSTABLE SPEED CONTROL
Filed July 1, 1935.  2 Sheets-Sheet 1

INVENTOR:
ALLEN M. ROSSMAN
BY: C. T. Parker
ATTORNEY

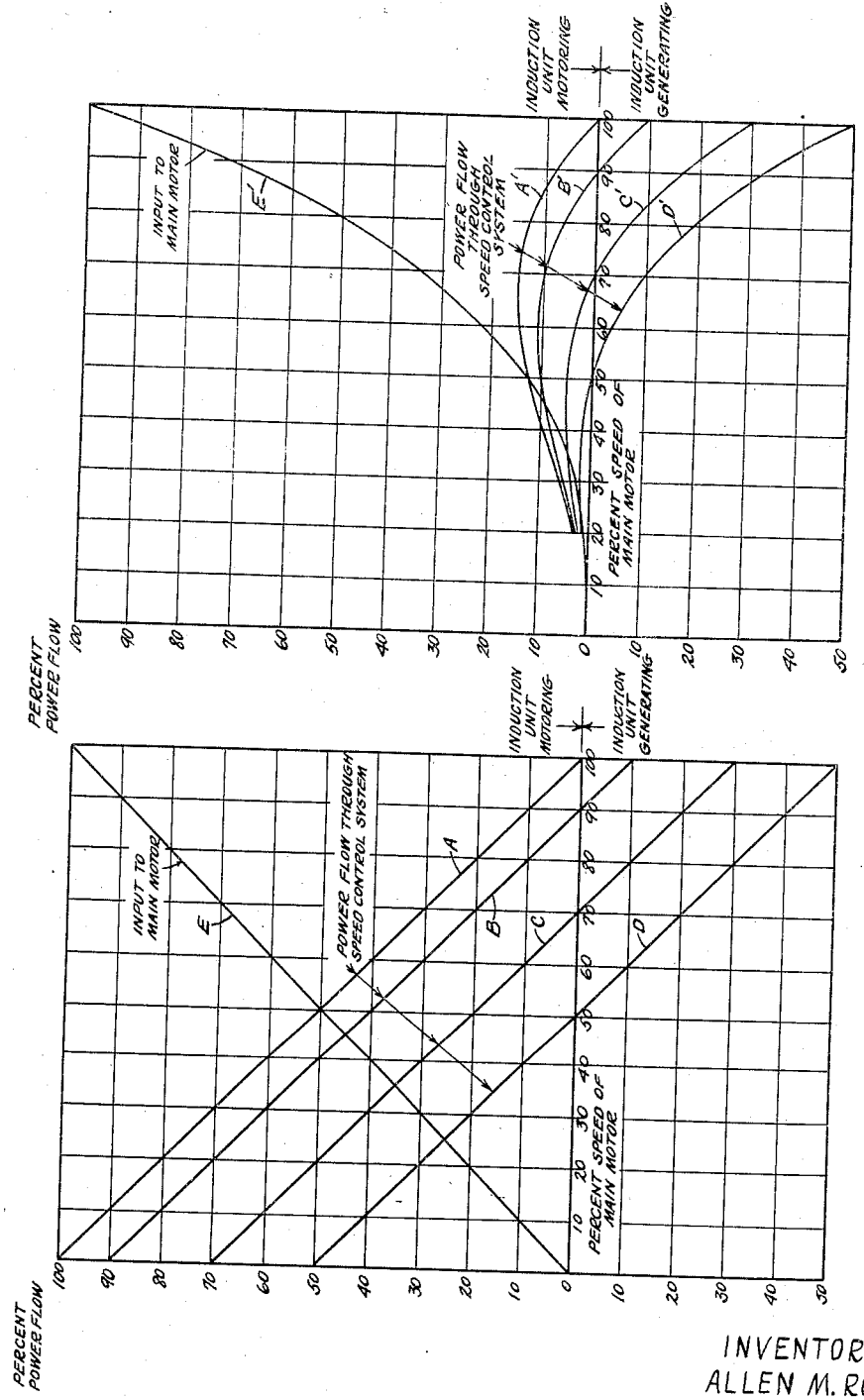

Patented Nov. 22, 1938

2,137,989

UNITED STATES PATENT OFFICE 2,137,989

ADJUSTABLE SPEED CONTROL

Allen M. Rossman, Wilmette, Ill.

Application July 1, 1935, Serial No. 29,190

6 Claims. (Cl. 172—274)

The present invention relates generally to adjustable speed control of alternating current motors and more particularly to means for adjusting the speed of a synchronous machine.

Most systems of adjustable speed control of alternating current motors employ a wound rotor type induction machine as the main unit, the speed of which is controlled by controlling the frequency of the energy flowing in the secondary winding.

One of the principal objections to this type of adjustable speed drive is the inherently low power factor of an induction motor. This objection becomes of increased importance in the class of large, low speed drive units in which perhaps the greatest benefits can be realized from an alternating current system of adjustable speed control, because the lower the speed of an induction motor the poorer its power factor becomes. Although in most of the systems which employ an induction motor as the main unit, some power factor correction is supplied by the auxiliary speed control machines, these machines are usually too small to fully compensate for the large amount of reactive power drawn by the main motor.

For this reason, a system which employs a synchronous main motor has a great advantage, as a means of power factor control is inherently available in the motor itself. Furthermore, in the large, slow speed class of machines, the synchronous motor is less expensive and more rugged than the induction motor because its larger air gap permits a greater freedom in the design.

A principle by which a continuous range of speed control of a conventional synchronous type machine can be effected is by adjustment of the frequency of the energy supplied to it. While this principle is well known, it has not been commercially applied to any great extent as the method heretofore employed to control the frequency is to supply power from a second synchronous machine driven by an adjustable speed prime mover, resulting in a very expensive combination as the auxiliary control machines are each of the same size or capacity as the drive unit.

The principal object of the present invention relates to the provision of a system of speed control of a synchronous type main machine by auxiliary or control machines of sizes which are determined by the amount of speed adjustment desired and which carry but a fraction of the power supplied to the main unit.

Another object relates to the means for further decreasing the size of the auxiliary machines by operating the control over its range twice to obtain a continuous range of adjustable speeds on the main synchronous machine.

A further object has to do with an arrangement for obtaining a constant horsepower output at the load shaft over the normal speed range.

Still another object is concerned with a system which delivers a constant torque over the normal speed range.

Another object relates to an arrangement for driving a load such as a fan or centrifugal pump by means of which further economies can be effected in the auxiliary equipment.

Other objects relate to methods of starting the load shaft.

Further objects will become apparent from the disclosure.

I will now explain the principles and methods of operation of certain embodiments of my invention with the aid of the following drawings appended hereto:

Figure 4 is a group of curves illustrating the power flows in the various circuits of constant torque arrangements at various speeds.

Figure 5 is a group of curves similar to Figure 4 but for a load of the fan or centrifugal pump type.

Throughout the specification and drawings, like reference numerals refer to like parts.

Figure 1:
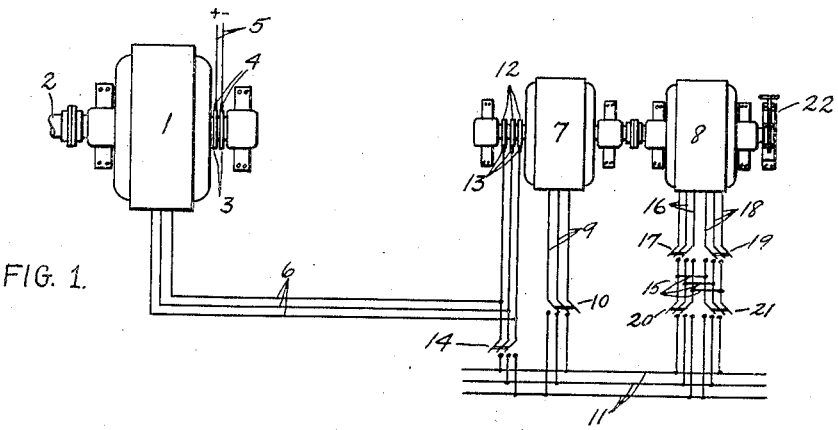
Figure 1 is a diagram of one embodiment of my invention shown in plan.

In Figure 1, the main drive unit 1 is coupled to the load shaft 2. This machine 1 is shown as a synchronous machine having a separately excited field winding supplied by direct current through a pair of collector rings 3, brushes 4, and leads 5. The armature winding is connected to leads 6.

The auxiliary machines in this embodiment consist of a wound rotor type induction machine 7 coupled to a multi-speed squirrel cage induction machine 8.

The wound rotor machine 7 has a primary winding connected by leads 9 and a switch 10 to the busbars 11 which are connected to the power supply. The secondary winding of this machine is brought out to collector rings 12 and is connected to the armature leads 6 of the synchronous machine 1 through brushes 13. Hence, the synchronous machine 1 is connected to the power system in series with the induction machine 7. A switch 14 is provided for connecting the synchronous machine direct to the power supply when so desired.

The multi-speed motor is shown as having two windings, one winding connected to a common tie 15 by leads 16 and a switch 17, and the other winding connected to the common tie 15 by leads 18 and a switch 19. The common tie 15 is connected to the bus 11 by means of a pair of reversing switches 20, 21.

The embodiment of Figure 1 is adapted to give a total of five speeds, spaced equally or otherwise. The operation can best be explained by an example. Assume that the synchronous motor 1 is a 12-pole machine with a speed of 600 R. P. M. on 60 cycles, and the induction unit 7 is a 2-pole machine, while the multi-speed machine is designed for speeds of 600 and 1200 R. P. M.

The normal speed of 600 R. P. M. of the synchronous motor can be obtained by either operating the machine connected directly to the bus 11 through the switch 14 or by connecting it to the bus through the induction machine 7 by closing the switch 10, the induction machine 7 being held by a brake 22 which prevents rotation. In the latter case, machine 7 acts merely as a transformer through which power flows to the synchronous motor 1 at 60 cycles.

Now, if the brake 22 be released, the wound rotor induction machine 7 will tend to accelerate as a motor and if allowed to continue with no restraint, it would approach its synchronous speed of 3600 R. P. M. However, by closing the low-speed switch 17 and the proper one of the two reversing switches 20, 21, the multi-speed motor 8 will hold the speed down to about 600 R. P. M. or slightly higher, the latter machine operating as an induction generator. The wound rotor machine 7, as it is running at one-sixth of its rated speed, delivers 50 cycles from its secondary winding to the synchronous motor 1; hence, the speed of the latter is now 500 R. P. M.

Similarly, by permitting the wound rotor machine 7 to run at 1200 R. P. M. by operating the multi-speed motor on its high speed winding as a generator, the frequency of the energy in the secondary winding of the wound rotor machine becomes 40 cycles, resulting in a speed of 400 R. P. M. of the synchronous motor 1.

If the multi-speed machine 8 be reversed so that it drives the wound rotor machine 7 against its torque, the frequency of the energy in the secondary winding will be increased instead of decreased and, at a speed of 600 R. P. M. in this direction of rotation, the induction machine 7 will deliver power to the synchronous motor 1 at 70 cycles, while the multi-speed machine now operates as a motor instead of a generator at slightly less than 600 R. P. M. Under these conditions, the synchronous motor runs at a speed of substantially 700 R. P. M.

The fifth and highest operating speed of 800 R. P. M. of the synchronous machine is obtained by driving the wound rotor machine at 1200 R. P. M. by means of the high speed winding on the multi-speed motor. In this case the secondary winding delivers power to the synchronous machine at 80 cycles.

In this example, a speed range of 400 to 800 R. P. M. of the synchronous motor is provided, over which range it is to be noted that the auxiliary or control machines 7, 8, were operated over their normal speed range twice, once in each direction of rotation.

As the same current flows in both the synchronous and the wound rotor machines 1, 7, the torque ratings and therefore the core sizes are approximately proportional to the numbers of poles, therefore the size of the induction machine 7 is in the order of one-sixth of the size of the main unit 1. As the multi-speed machine 8 is designed to balance the torque of the wound rotor machine 7, it also has approximately one-sixth of the torque rating of the synchronous machine. It is therefore clear that the fewer the number of poles on the wound rotor machine, the smaller will be its size and that of the machine coupled to it.

Although an asynchronous machine such as a squirrel cage induction machine can be substituted for the synchronous machine 1, such a combination would not be as desirable, not only from the standpoint of the low power factor of the energy drawn from the system, but because the magnetizing current for the main machine must necessarily flow through the wound rotor machine, which results in a drop in voltage and an appreciably lower pull-out torque of the main unit.

Although the foregoing explanation assumes that the shaft 2 is a load shaft driven by the synchronous machine 1, a similar operation would result if the shaft 2 were a prime mover shaft driving the synchronous machine 1 as a generator. An example of such an application is a waterwheel driven generator. By this method of control, the speed of the waterwheel can be adjusted to approximately the most efficient speed under each condition of head of water, while the control system permits and compensates for a deviation between generated frequency and the constant frequency of the power system.

Figure 2:
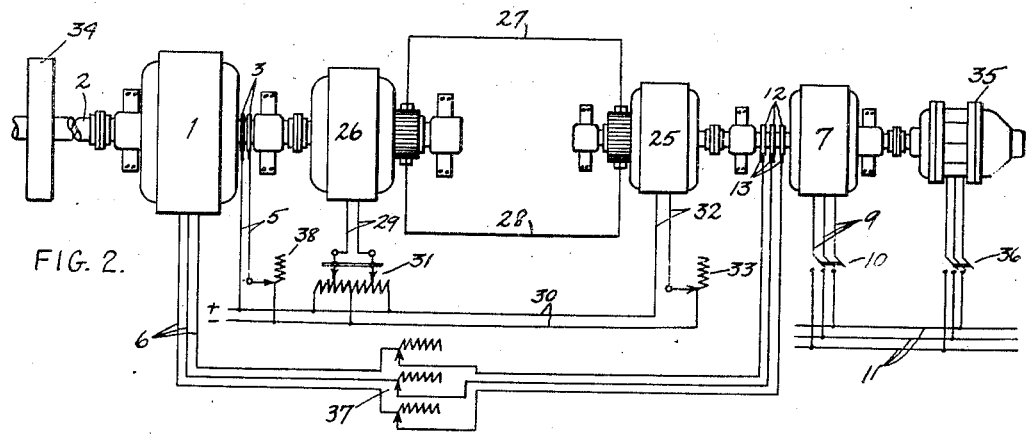
Figure 2 is a diagram of a constant horsepower embodiment.

In the embodiment of Figure 2, the wound rotor induction machine 7 is coupled to a direct current machine 25 instead of to a multi-speed induction machine 8 as in Figure 1. Another direct current machine 26 is coupled to the main synchronous machine 1, the armature windings of the two D. C. machines being connected in series by a pair of conductors 27, 28.

The field windings of the D. C. machine 26 are connected to a pair of leads 29 and are supplied with excitation from a direct-current bus 30 through a reversible field control rheostat 31, illustrated by a potentiometer type rheostat, by means of which the voltage impressed on the field leads 29 can be adjusted gradually over a continuous range from a maximum value of one polarity, through zero, to a maximum value of the opposite polarity.

The field leads 32 of the other D. C. machine 25 are connected to the D. C. bus 30 through an adjustable rheostat 33 by means of which the voltage impressed on the field leads can be adjusted.

Speed control is effected by rotating the induction machine 7 in one or the other direction of rotation, thereby obtaining power at adjustable frequency from the secondary winding which is connected by collector rings 12, brushes 13, and leads 6, to the armature winding of the synchronous machine 1.

Control of the rotation of the induction machine 7 is effected by speed control of the D. C. machine 25 to which it is coupled. This is accomplished by holding the field excitation of the latter machine constant, and adjusting the voltage applied to its armature terminals. Adjustable voltage is obtained by field adjustment of the second D. C. unit 26 coupled to the synchronous machine 1, the range of adjustment extending from a maximum value of one polarity, through zero, to a maximum value of the opposite polarity, under the control of the potentiometer type rheostat 31 or other known reversible control means.

When the armature voltage of the D. C. machine 26 is of one polarity, the other D. C. machine 25 rotates in one direction of rotation whereby the frequency of the power supplied to the synchronous machine 1 is decreased below that of the power supply bus 11. When the D. C. voltage is of the opposite polarity, the other D. C. machine 25 rotates in the other direction of rotation and the frequency of the power supplied to the synchronous machine is increased above that of the bus 11. In the first instance the induction machine 7 operates as a motor, driving the D. C. machine 25 as a generator, which in turn furnishes power to the other D. C. machine 26 which operates as a motor, adding its torque to that of the synchronous machine 1. In the second instance, the induction motor is rotated against its torque to raise the secondary frequency above the power supply frequency, therefore the D. C. machine 25 operates as a motor, drawing power from the other D. C. machine 26, which then generates, its torque therefore being subtracted from the torque of the synchronous machine 1, the difference being applied to the load shaft 2.

At the point where the excitation of the D. C. machine 26 passes through zero, the generated voltage of that machine is zero, the other D. C. machine 25 being in effect short circuited and therefore the latter machine holds the induction machine substantially stationary, its speed being only that necessary to cause full load current to flow through the short circuit connection. At this point power is supplied to the synchronous machine at practically the frequency of the power supply system, the induction motor acting merely as a transformer.

With a constant input from the power supply bus 11 to the induction machine 7, there is a constant horsepower output to the load shaft 2 at every speed in the range. The torque of the synchronous machine 1 under this condition remains constant throughout the entire speed range. The torque of the D. C. machine 25 coupled to the induction machine also remains constant throughout the speed range, consequently the direct current in the series armature circuit likewise remains constant. There is no reversal of direct current in this circuit as the voltage passes through zero; therefore there is no discontinuity of torque in the entire speed range.

It is evident that as the D. C. machine 26 coupled to the synchronous machine 1 varies in speed with the load shaft, for the same value of field current of either polarity, the armature voltage of the machine will be greater in one polarity than in the other.

An example will best serve to explain the practical application of this system:

Assume a load of 1000 H. P. over a speed range of 100% speed to 50% speed. As the power output is constant over the speed range, the torque at 50% speed is necessarily double that at 100% speed.

Assuming that the induction machine 7 is stationary at the midpoint of the speed range, or 75% speed, the synchronous machine 1 at that point carries the entire load, as substantially no power flows in the D. C. circuit. Therefore, at 75% speed, the frequency of the power supplied to the synchronous machine is equal to the power supply frequency which may be 60 cycles. To bring the load shaft up to 100% speed, the frequency must be raised 33⅓% to 80 cycles; similarly to attain 50% speed, it must be decreased 33⅓% to 40 cycles.

The distribution of power at these three points in the speed range is set forth in the following table:

| Percent speed of load shaft | Cycles at synchronous machine | H. P. output to load shaft | | |
|---|---|---|---|---|
| | | From synchronous machine | From D. C. machine | Total |
| 100 | 80 | 1333 | −333 | 1000 |
| 75 | 60 | 1000 | 0 | 1000 |
| 50 | 40 | 666 | +333 | 1000 |

From this table it is seen that the D. C. machine 26 on the load shaft must deliver 333 H. P. at 50% speed as a motor and 333 H. P. at 100% speed as a generator. Hence, as it must be designed for the limiting conditions at one-half speed, it carries only one-half its rated load under the 100% speed conditions at which speed it has a capacity of 666 H. P.

In order to obtain a better balance on this D. C. machine 26, the point at which busbar frequency is supplied to the synchronous machine may be selected at 66⅔% speed for a 2/1 speed range. The table of power distribution then appears as follows:

| Percent speed of load shaft | Cycles at synchronous machine | H. P. output to load shaft | | |
|---|---|---|---|---|
| | | From synchronous machine | From D. C. machine | Total |
| 100 | 90 | 1500 | −500 | 1000 |
| 66⅔ | 60 | 1000 | 0 | 1000 |
| 50 | 45 | 750 | +250 | 1000 |

Here, the D. C. machine 26 on the load shaft carries its full load both at half speed and at full speed but the other D. C. machine 25, coupled to the induction machine 7 must operate twice as fast in one direction of rotation as in the other, although its torque remains constant. It must therefore be designed to meet the higher speed conditions.

In the final analysis, economical considerations will determine which of the two above methods of application is preferable.

The number of poles on the induction machine should be as small as possible, limited, however, by the practicable operating speeds of D. C. machines of the size contemplated in any application. In general, as the number of poles on the induction machine decreases, the torque of the D. C. machine coupled to it also decreases while the speed increases. Within limits, the cost and weight of electrical machines of a given horsepower capacity decrease as the speed increases, a fact well known to those skilled in the art.

Of course, the horsepower capacities of the auxiliary machines are independent of the number of poles on the induction machine, being dependent only on the total load and the amount of speed deviation of the load shaft from that which results when normal busbar frequency is applied to the synchronous machine.

One of the best known applications of the constant horsepower form of adjustable speed drive is that of driving the rolls of a steel mill. Another well known form of drive is that employing a flywheel for absorbing peaks in the load demand, thereby enabling the use of motors of lower capacity. This form of drive is usually nominally constant speed but with a small amount of speed variation so that the speed of the motor can be decreased slightly to permit the flywheel to give up a portion of its stored energy during periods of temporary overload.

Figure 2 indicates a flywheel 34 which may be connected to the load shaft 2 when conditions require it.

Methods of starting and accelerating the load shaft 2 and the auxiliary machines 7, 25 are shown in Figure 2. One method of starting is by means of a starting motor 35 of conventional type, usually an induction machine. This machine is first connected to the power supply bus 11 by a switch 36 and accelerated up to normal speed, carrying with it, the induction machine 7 and the D. C. machine 25. The normal speed of this motor 35 may be the maximum speed of the D. C. machine 25, and the direction of rotation is such that when it is up to speed, the frequency of the voltage at the collector rings 12 would be less than the frequency of the power supply if the switch 10 were closed.

During the acceleration of the D. C. machine 25, its field circuit is left unexcited. Then, to start the synchronous machine 1 the other D. C. machine 26 coupled to it is given full excitation of the proper polarity to start it in the correct direction of rotation, and then the voltage of the D. C. machine 25 is gradually built up by means of the field rheostat 33, to normal value, thereby causing the synchronous motor and load shaft to be brought up to operating speed by the D. C. machine 26, at which speed, voltage at substantially busbar frequency will be generated at the induction motor leads 9. By slightly adjusting the speed of the D. C. machine 26, the A. C. machines 1, 7 can then be synchronized to the power supply and connected thereto by the switch 10.

This method of starting has the advantage that the starting motor has only the unloaded auxiliary machines to accelerate, but when the main synchronous motor 1 and load shaft 2 are being started, the starting motor has its full pull-out torque available as it is then operating at normal speed. Furthermore, during the "breaking out" of the load shaft 2 at start, when the maximum value of starting torque is required, the starting motor is subjected to very little load, as it is called on only to supply the horsepower required, which is comparatively low at this point. The actual torque is supplied by the D. C. machine 26, which type of machine is capable of very heavy short-time overloads.

Another method of starting is to merely close the switch 10, thereby connecting the A. C. machines in circuit, which, of course, results in a heavy draft of low power factor energy from the system. By inserting a starting rheostat 37 in the secondary circuit of the induction machine 7, the torque of this machine is increased during starting and the draft of current is decreased. With this method of starting, the D. C. machines should be excited in the correct polarity in order to prevent the induction machine from over-speeding.

Maximum starting and accelerating torque can be obtained by employing both the starting motor 35 and the A. C. machines 1, 7 during starting. This can be done by first bringing the auxiliary machines 7, 25 up to speed by the starting motor 35 and then closing the switch 10, whereby the synchronous motor 1 adds its torque to that of the D. C. machine 26 while the induction machine 7 adds its torque to that of the starting motor 35, the field rheostat 33 and the starting resistor 37 being adjusted together. Instead of bringing the auxiliary machines 7, 25 up to speed before starting the load shaft, the switch 10 can be closed at the same time the starting motor switch 36 is closed, control of the acceleration being effected by the starting resistors 37. In this case the D. C. machines are under full excitation during starting to maintain substantially constant relative speeds between the two sets of machines.

After all machines are up to their proper speeds and ready for normal operation, the starting motor 35 must be disconnected from the power supply to permit speed adjustment of the induction machine 7 by the D. C. machine 25.

Control of the power factor of the power drawn from the bus 11 is effected by a rheostat 38 in series with the leads 5 from the synchronous motor field winding which obtains direct current from the excitation bus 30.

Figure 3:
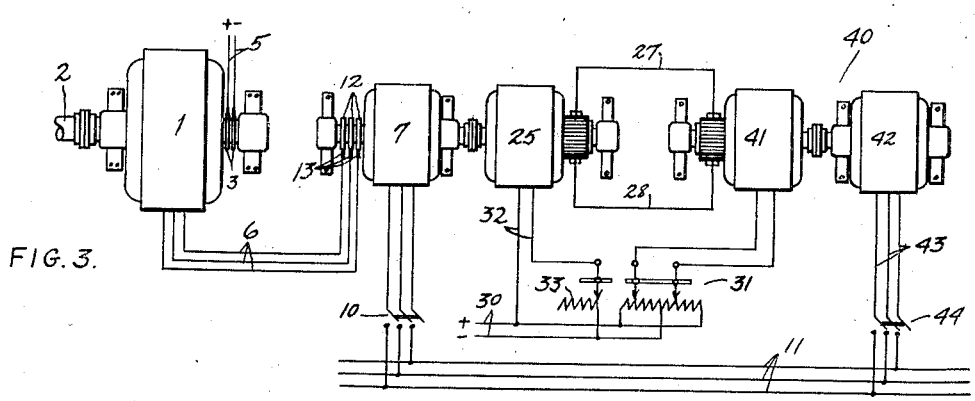
Figure 3 is a diagram of a third embodiment.

Figure 3 shows an arrangement for use on loads whose characteristics do not require increased torque at lower speeds, such as constant torque loads or loads requiring decreasing torque as the speed decreases.

This arrangement differs from that of Figure 2 in that in place of the D. C. machine 26 coupled to the synchronous machine, there is installed a separate motor generator set 40 comprising a D. C. machine 41 connected by conductors 27, 28 to the D. C. machine 25, and a constant speed type A. C. machine 42 such as a synchronous or induction machine, connected to the bus 11 by leads 43 and a switch 44. This set furnishes D. C. power to the D. C. machine 25 that controls the induction machine 7 and, at other times, converts power, received from the D. C. machine 25, into A. C. energy and returns it to the power supply bus 11.

Operation is in general similar to that described in connection with Figure 2, except that the D. C. machine 41 operates at a constant speed which is independent of the speed of the load shaft 2. Hence, for a constant torque load, the most economical arrangement is that in which the induction machine 7 passes through zero speed at the midpoint of the speed range. For example, if the speed range is 100% to 50% speed, with the induction machine stationary, the synchronous machine operates at 75% of the predetermined maximum speed, with normal power supply frequency impressed on its armature winding.

The maximum power flow in the D. C. machines 25, 41 and the constant speed machine 42 is proportional to the deviation from the speed at which the induction machine 7 is stationary. If this speed is 75% of the maximum speed of the synchronous machine, at 100% speed the power flow through the control machines is 25% of the power output to the synchronous machine, and this 25% power is taken from the system through the constant speed machine 42, through the D. C. machine 41 operating as a generator, to the D. C. machine 25 which drives the induction machine 7, increasing the frequency in the main leads 6 from 60 to 80 cycles. At minimum speed, the induction machine 7 drives the D. C. machine 25 in the opposite direction, half of the maximum value of power flowing from the secondary winding of the induction machine at 30 cycles to the synchronous machine, the other half being returned to the system bus 11 through the D. C. machines 25, 41 and the A. C. machine 42, the latter operating as a generator.

Control of the speed of the D. C. machine 25 and the induction machine 7 is effected as before by adjusting the armature voltage by the control rheostat 31 operating on the field of the D. C. machine 41, the adjustment of field intensity and hence that of armature voltage and speed of the other D. C. machine 25, extending from a maximum value in one direction through zero, to a maximum value in the opposite direction.

The arrangement in Figure 3 is applicable not only to speed control of a synchronous motor 1 but also where the synchronous machine 1 is a generator furnishing power to the system bus 11, and it is desired to permit relative deviations between the generated frequency and the frequency of the bus voltage. Besides the waterwheel driven generator mentioned hereinbefore, a frequency converter is another example of its use, the embodiment of Figure 3 being particularly applicable in the latter instance, as frequency adjustments in small increments are required.

Another application to which the embodiment of Figure 3 is especially adaptable is that of driving fans or centrifugal pumps in which substantial economies can be effected by this system. In loads of this class, the torque is proportional to the square of the speed and the power is proportional to the cube of the speed. Because of this characteristic, the synchronous machine 1 can be designed to drive the fan at approximately 90% of the maximum speed with normal system frequency applied to its armature winding with the induction machine 7 stationary. By rotating the latter machine in one direction of rotation, the frequency of the power supplied to the synchronous motor 1 can be increased to bring the speed up to 100% by D. C. armature voltage control by means of the field control rheostat 31. Similarly, the speed of the synchronous motor 1 and the fan or pump shaft 2 can be decreased a like amount below 90% by armature voltage control in the negative polarity. At this point in the speed range, the torque on the shaft 2 has decreased to such an extent that the synchronous machine and hence the D. C. machine 25 is underloaded, therefore the latter machine 25 which is now operating as a generator, can be operated with reduced field without overloading it. Reducing its field excitation by means of the field rheostat 33, tends to decrease its generated voltage but as the voltage between the leads 27, 28 is fixed by the counter E. M. F. of the constant speed D. C. machine 41 which is now operating with constant field excitation, the D. C. generator 25 is accelerated in speed by the induction machine 7 until its voltage balances the voltage across the conductors 27, 28. When the induction machine thus increases its speed, operating as a motor, the frequency of the power supplied from its collector rings 12 decreases, causing the speed of the synchronous machine to decrease.

As further increases in the speed of the D. C. generator 25 result in a rapid falling off of torque, that machine never reaches an overload condition and hence the only limit to this adjustment is that of peripheral speeds of the armature and commutator. Speed limitations on commercially standard D. C. machines are in the order of 300 of 400% of the speed attained with full field. Hence, by reducing the field of the D. C. machine 25, the speed of the fan shaft 2 can be reduced from 80% to approximately 50%. In this manner, with control machines of about 10% of the maximum horsepower requirement of the fan or pump load, a speed variation of 2 to 1 can be obtained.

The relations of power flow and speeds of the various machines will be made clearer to those skilled in the art by the curves shown in Figures 4 and 5.

Figure 4 shows the conditions which exist in the case of a constant torque load in which the power input to the main synchronous machine 1 is directly proportional to the speed (curve E). The other curves A, B, C, and D, show the power flow through the D. C. machines 25, 41 and the constant speed A. C. machine 42. Curve A shows the power which flows back to the power supply bus through the speed control machines where the induction machine is stationary at the maximum or 100% speed of the load. Curves B, C, and D show the flow of power where the point at which the induction machine is stationary falls at 90%, 70%, and 50% speed respectively. In the latter curves the portion below the base line represents power which must be supplied to drive the induction machine as a generator to raise the frequency of the energy supplied to the synchronous machines, above that of the bus.

For example, curve C shows that at 70% speed the induction machine 7 is stationary and busbar frequency is supplied to the synchronous machine. At 100% speed, 30% of the power flows through the auxiliary or control machines 42, 41, 25 to drive the induction machine 7. With these machines running at the opposite end of the range, assuming them to have a capacity of 30%, the load speed can be brought down to 40% of its maximum value.

Figure 5 shows corresponding curves for a fan or centrifugal pump load in which the power input is proportional to the cube of the speed. Corresponding curves are given corresponding reference letters, primed. Here it can be seen that curve A' reaches a maximum value of 14.8% at 66⅔% of maximum speed. Curve B which crosses the base line at 90% speed has a maximum value of 10.8% power at 60% load speed. At 100% load speed the power flow in the control machines is 10% in the opposite direction. Hence, this curve shows conditions which are nearly balanced in the two opposite portions of the control range of the D. C. machines, thereby permitting the use of field control of the adjustable speed D. C. machine 25 as explained before.

To determine the maximum power transmitted through the speed control system in the lower part of the speed range of the synchronous motor, in other words, the maximum point on the knees of the curves A', B', C', and D', let $S_0$=the fraction of the maximum speed of the synchronous motor at which the induction machine is stationary, that is, the point at which the above curves cross the base line.

Then the maximum of each curve is equal to:

$$P_{max} = \frac{4}{27} S_0^3$$

and this maximum point will occur at a speed equal to:

$$S = \frac{2}{3} S_0$$

The curves of Figures 4 and 5 can be used for analyzing applications of the embodiment of Figure 1, the various operating speeds obtainable by that embodiment being regarded as points on the curves.

In each of the embodiments described herein, although I have shown and described the induction machine 7 as directly coupled to the control machine, this connection might in some cases be preferably made by gearing or belting to obtain a mechanical advantage.

In the foregoing specification and in the claims which follow, the terms "primary" and "secondary" as applied to the windings of the induction machine may be used interchangeably to refer to the rotor or stator windings respectively. For the purposes of this disclosure by "primary winding" I prefer to the winding, either rotor or stator winding, which is connected to the bus, and by "secondary winding" I refer to that winding connected to the leads 6 of the synchronous machine 1.

I do not intend my invention to be limited to the details exactly as shown and described herein except as they are set forth in the following claims.

I claim:

1. A system of adjustable speed control comprising in combination, a synchronous machine having an armature winding, a source of power, a wound rotor type induction machine having a primary winding connected to said source of power and a secondary winding connected to said armature winding, a first direct current machine coupled to said induction machine, a second direct current machine coupled to said synchronous machine, each of said direct current machines having an armature winding, said direct current armature windings being connected in series, and means comprising field control means associated with said second direct current machine, for controlling the speed of said first direct current machine over a continuous range from a maximum speed of rotation in one direction, through zero speed, to a maximum speed of rotation in the opposite direction, to adjust the frequency of the energy in said synchronous machine winding from a value less than the frequency of the source of power to a value greater than that of the source of power.

2. A system of adjustable speed control comprising in combination, a synchronous machine having an armature winding, a source of power, a wound rotor type induction machine having a primary winding adapted for connection to said source of power and a secondary winding connected to said armature winding, a first direct current machine coupled to said induction machine, a second direct current machine coupled to said synchronous machine, each of said direct current machines having an armature winding, said direct current armature windings being connected in series, means for controlling the field intensity of said second direct current machine for controlling the speed of said first direct current machine to adjust the frequency of the energy in said synchronous machine winding, and starting means comprising a starting motor mechanically connected to said first direct current machine and to said induction machine for bringing the two last mentioned machines up to and holding them at a predetermined substantially constant speed, and means for controlling the field intensity of said first direct current machine, for starting and accelerating said second direct current machine and said synchronous machine.

3. A system of adjustable speed control, comprising in combination, a synchronous machine having an armature winding, a source of power, a wound rotor type induction machine having a primary winding adapted for connection to said source of power and a secondary winding connected to said armature winding, a first direct current machine coupled to said induction machine, a second direct current machine coupled to said synchronous machine, each of said direct current machines having an armature winding, said direct current armature windings being connected in series, means for controlling the field intensity of said second direct current machine for controlling the speed of said first direct current machine to adjust the frequency of the energy in said synchronous machine winding, and starting means comprising a starting motor mechanically connected to said first direct current machine and to said induction machine for bringing the two last mentioned machines up to and holding them at a predetermined substantially constant speed, means for controlling the field intensity of said first direct current machine for starting and accelerating said second direct current machine and a resistor in series with said secondary winding and said synchronous machine winding for providing additional starting torque from said induction machine and said synchronous machine.

4. In combination, a load shaft, a flywheel connected thereto, a synchronous machine coupled to said shaft, said machine having an armature winding, a source of power, an induction machine having a primary winding connected to said source of power and a secondary winding connected to said armature winding, a first D. C. machine coupled to said induction machine, a second D. C. machine coupled to said load shaft, each of said D. C. machines having an armature winding, said two last named windings being connected in series, and means for controlling the field intensity of said second D. C. machine to control the speed of said first D. C. machine and hence of said induction machine for adjusting the frequency of the energy in said synchronous machine winding, whereby upon a momentary overload on said load shaft, the frequency of the energy in said synchronous motor winding may be decreased slightly to allow said flywheel to give up a portion of the stored energy during the period of overloading 5. In combination, a load shaft, a flywheel connected thereto, a synchronous machine connected to said shaft, said machine having an armature winding, a source of power, an induction machine having a primary winding connected to said source of power and a secondary winding connected to said armature winding, a first direct current machine coupled to said induction machine, a second direct current machine coupled to said synchronous machine, each of said direct current machines having an armature winding, said two last named windings being connected in series, and means for controlling the field intensity of said second direct current machine to control the speed of said first direct current machine and hence of said induction machine for adjusting the frequency of the energy in said synchronous machine winding, whereby upon a momentary overload on said load shaft, the frequency of the energy in said synchronous motor winding may be decreased slightly to allow said flywheel to give up a portion of its stored energy during the period of overloading.

6. A system of adjustable speed control comprising in combination, a synchronous machine having an armature winding, a source of power, an induction machine having a primary winding connected to said source of power and a secondary winding connected to said armature winding, a first D. C. machine coupled to said induction machine, a separately excited D. C. machine coupled to said synchronous machine, each of said D. C. machines having an armature winding, said two last named windings being connected in series, and means for controlling the field intensity of said separately excited D. C. machine to control the speed of said first D. C. machine and hence of said induction machine for adjusting the frequency of the energy in said synchronous machine winding.

ALLEN M. ROSSMAN.